United States Patent [19]

Partington et al.

[11] Patent Number: 4,765,046
[45] Date of Patent: Aug. 23, 1988

[54] ROW ASSEMBLY PROCESS FOR INTEGRAL SHROUD BLADES

[75] Inventors: Albert J. Partington, Winter Springs; Michael K. Brown, Casselberry; Jurek Ferleger, Longwood, all of Fla.; C. Kelly Ange; Anthony Hodgson, both of Charlotte, N.C.; David A. Hornberger, Waxhaw, N.C.; Marshall J. Rouse; Spencer H. Shepard, both of Charlotte, N.C.; Phillip H. Bonardi, Rural Hall; William E. Kiger, Germanton, both of N.C.

[73] Assignee: Westinghouse Electric Corp., Pittsburgh, Pa.

[21] Appl. No.: 53,300

[22] Filed: May 22, 1987

[51] Int. Cl.$^4$ .............................................. B21K 3/04
[52] U.S. Cl. ............................. 29/156.8 R; 29/156.8 B
[58] Field of Search ................... 29/156.8 B, 156.8 R, 29/464, 467, 446; 416/190, 191, 195, 196 R, 212

[56] References Cited

U.S. PATENT DOCUMENTS

| | | | |
|---|---|---|---|
| 2,354,587 | 7/1944 | Franck | 29/156.8 B |
| 2,620,554 | 12/1952 | Mochel et al. | 29/156.8 B |
| 2,681,500 | 6/1954 | Whitehead | 29/156.8 B |
| 3,328,867 | 7/1967 | Guengant | 29/156.8 B |
| 4,533,298 | 8/1985 | Partington et al. | 416/191 |
| 4,602,412 | 7/1986 | Partington et al. | 29/156.8 B |

Primary Examiner—P. W. Echols
Assistant Examiner—Irene Cuda

[57] ABSTRACT

A method is provided for forming a circular array of rotatable blades from blades having an integral shroud with a leading planar surface and a trailing planar surface, the leading planar surface being generally parallel to an axial radial plane passing through the center of the root of the blade and the trailing surface, if extended, intersecting the axial radial plane passing through the center of the root of the blade to form an angle generally equal in degrees to 360 divided by the number of blades forming the circular array. Strict radial alignment is provided by assembling the complete blade row such that all blade center lines coincide with the groove center lines, with the shroud mating surfaces in complete contact and in tangential compression.

17 Claims, 3 Drawing Sheets

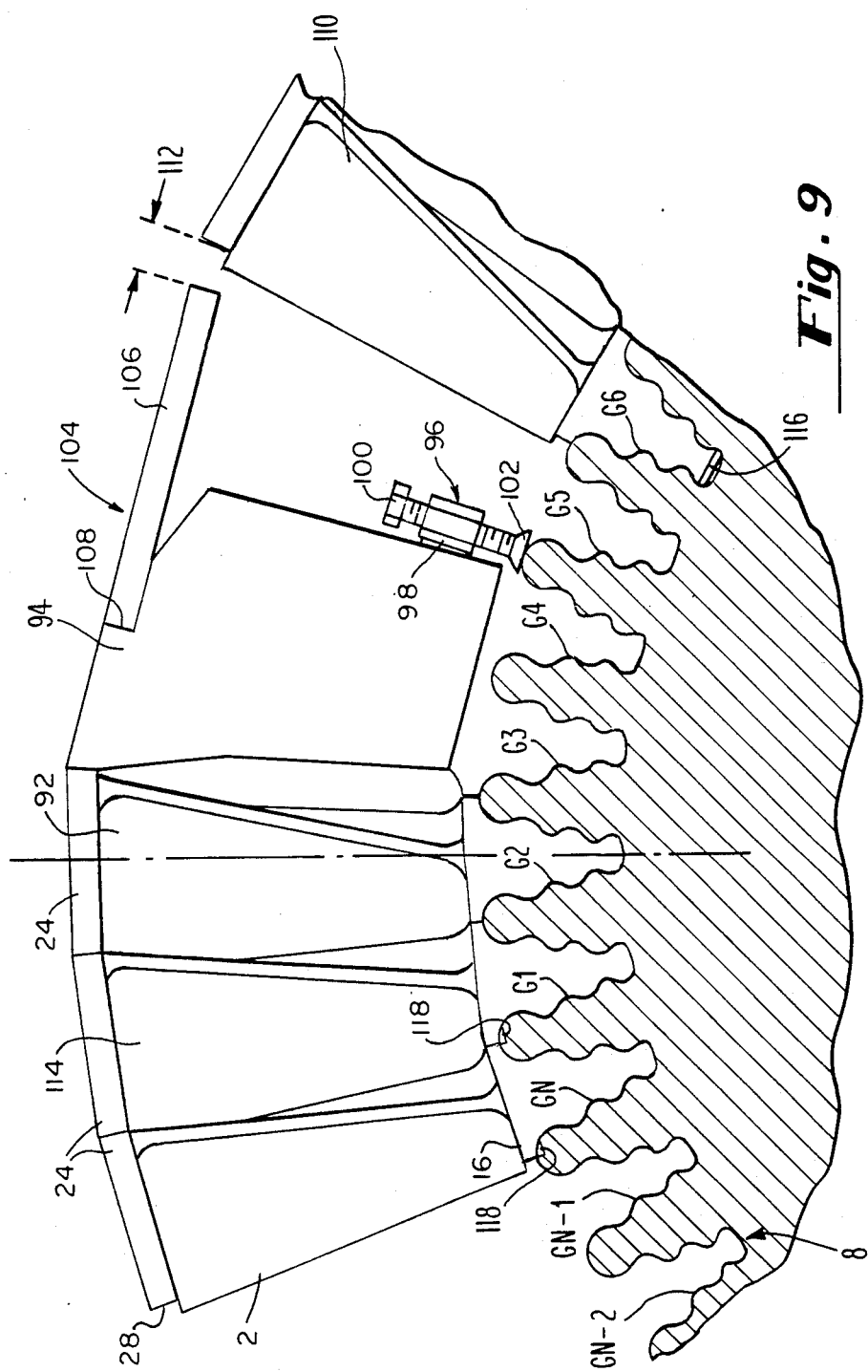

ROW ASSEMBLY PROCESS FOR INTEGRAL SHROUD BLADES

BACKGROUND OF THE INVENTION

This invention relates generally to turbine blades, and more particularly to rotating blades for a turbine.

In turbines, e.g., steam turbines, a plurality of rotating arrays of foils or blades are arranged circumferentially about a rotor. Reaction of steam or gases against the blades produces rotation of the rotor and associated blade arrays. The forces acting on these rotating blades, including centrifugal forces caused by rotation, tend to throw the blades radially outward and generate large forces on the blade attachment structure. In many turbines, the attachment structure comprises a Christmas tree shape root structure which slides into a mating slot or groove in the rotor. When the blade is properly positioned, lugs extending from opposing sides of the root structure share equally in retaining a blade to the rotor, however, if a blade is aligned off of a radial line of the rotor through the center of the rotor groove, lugs on one side of the root structure may support more force than those on the opposite side leading to potential overstress conditions. Accordingly, it is desirable to assure that turbine blades are aligned with their respective center lines oriented along radial lines of the turbine rotor.

Such arrays of rotating blades are often joined together at their tip by a shroud ring which are normally riveted to the blade via a tenon made integral with the blade. The tenon being an abrupt change in cross-section of the blade is subject to higher stresses due to bending moments imposed by the shroud ring and provides crevices wherein corrosion products are accumulated; provide a steam seal over the top of the blade and also however, the shroud rings greatly reduce blade vibration. One prior art turbine blade which eliminates the problems of tenon stress and corrosion is disclosed in U.S. Pat. No. 4,533,298, issued to Albert J. Partington et al on Aug. 6, 1985, assigned to the assignee of the present invention, and incorporated herein by reference.

Partington et al. teaches a plurality of rotatable blades disposed in a circular array, each blade comprising a root portion, which fastens the blades to the rotor, an airfoil shaped blade portion having a leading edge and a trailing edge, and a shroud portion made integral with the blade portion and disposed on the radially outer end of the blade portion. The shroud portion has a leading planar surface and trailing surface, one of the planar surfaces being disposed generally parallel to an axial radial plane passing through the central portion of the root portion, and the other planar surface if extended forming an angle with the radial axial plane passing through the center of the root portion generally equal in degrees to 360 divided by the number of blades forming the circular array. Such turbine blades are disclosed in U.S. Pat. No. 4,602,412, also issued to Partington et al on July 29, 1986, assigned to the assignee of the present invention, and incorporated herein by reference.

Requirements of strict radial alignment imposed to prevent unequal loading on the sides of a turbine blade root portion, and tight contact between the respective shroud to minimize vibration during full-speed operation and wear of the root portions during turning gear operation have necessitated a change in the approach to assembling rows of turbine blades having integral shrouds.

SUMMARY OF THE INVENTION

Accordingly, it is a general object of the present invention to provide a method of assembling a row of turbine blades upon a rotor, each of the blades having an integral shroud portion. More specifically, it is an object of the present invention to provide a row assembly process for integral shroud blades which prevents unequal loading on the sides of the turbine blade root portions.

Another object of the present invention is to provide a row assembly process for integral shroud blade which minimizes vibration during full-speed operation, as well as minimizes wear of the root portions during turning gear operation.

Still another object of the present invention is to provide a row assembly process for integral shroud blades in which the complete blade row is assembled such that all blade center lines coincide with the groove center lines, and with the shroud mating surfaces in complete contact and in tangential compression.

Briefly, these and other objects of the present invention are accomplished by a row assembly process for integral shroud blades generally comprising the steps of providing an anchored blade to start the row, monitoring any subsequent deflection of the anchored blade to determine its movement from a predetermined radial position, inserting a closing blade next to the anchored blade without locking the closing blade within its groove, sequentially inserting each of the remaining blades within their grooves, locking them in place, and prestressing each blade in a direction towards the anchored blade, positioning the blade radially with respect to the their grooves, relieving the force exerted upon the anchored blade by the prestressing steps, removing the anchored blade in order to complete the circular array, removing the closing blade to determine the size of the gap between the shroud portions of the blades installed on either side thereof, modifying the shroud portion of the closing blade to provide an interference fit within the gap, and thereafter installing the modified blade within its groove locking it in place.

These and other objects, advantages and novel features of the present invention will become more apparent from the following detailed description of a preferred embodiment when considered in conjunction with the accompanying drawings wherein:

BRIEF DESCRIPTION OF THE DRAWINGS

FIG. 9 is a partial sectional view of a circular array of rotatable blades disposed in a rotor, illustrating details of the method according to the present invention.

DESCRIPTION OF THE PREFERRED EMBODIMENT

Figure 1:
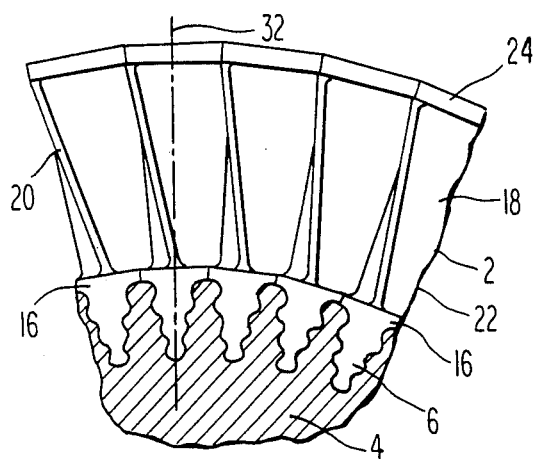
FIG. 1 is a partial sectional view of a circular array of a rotatable blades disposed in a rotor.

Referring now to the drawings, wherein like characters designate like or corresponding parts throughout the several views, there is shown in FIG. 1 a portion of a circumferential array of exemplary turbine blades 2 disposed in a portion of a turbine rotor 4.

Figure 4:
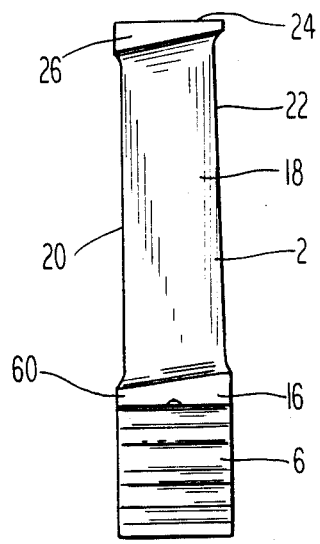
FIG. 4 is a tangential view of the integral shroud blade.
Figure 2:
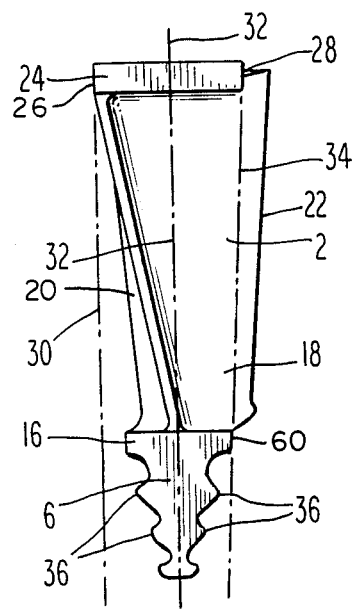
FIG. 2 is an axial view of an integral shroud blade.
Figure 3:
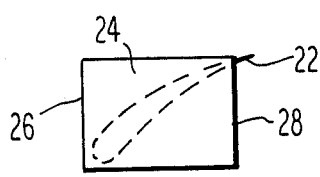
FIG. 3 is a radial view of the integral shroud blade shown in FIG. 2.

As shown best in FIGS. 2, 3 and 4, each turbine blade 2 comprises a Christmas tree shaped root portion 6 which registers with a similarly shaped slot or groove 8 in the rotor 4 to fasten the blades 2 to the rotor 4. A locking device is used in order to prevent axial movement of the blades 2. The root portion 6 extends from a blade platform 16.

Extending radially outwardly from the blade platform portion 16 is an airfoil shaped blade portion 18 having leading and trailing edges 20 and 22, respectively. Disposed radially outwardly of the blade portion 18 and made integral therewith, in accordance with the above referenced U.S. Pat. No. 4,533,298, is a shroud portion 24. The shroud portion 24 has a leading planar surface 26 and a trailing planar surface 28.

The leading planar surface 26 extends beyond the leading edge 20 of the blade portion 18, while the trailing edge 22 of the blade portion 18 extends substantially beyond the trailing planar surface 28 of the shroud portion 24. As is conventional, the outer periphery of the shroud portion 24 is machined to form a cylindrical ring which cooperates with labyrinth seals to form a rotating seal.

Each of the blades 2 is desirably aligned on a radial line of the rotor 4, or more specifically the blade center line 32 desirably coincides with a radial line of the rotor 4. In such an alignment, each lug portion 36 on the root portion 6 shares the centrifugal forces on blades 2 during turbine operation. If one of the blades 2 is misaligned, its root portion 6 may be stressed off-center causing a force increase on one or more of the lug portions 36 on only one side of the root portion 6. Such force increase may exceed the stress capability of the root structure resulting in blade root damage or may damage the rotor groove 8 in which the blade root portions 6 are retained. Since blade separation, whether from root failure or rotor groove failure, can be disastrous in a turbine, it is desirable to assure proper blade alignment at the time of assembly.

Figure 5:
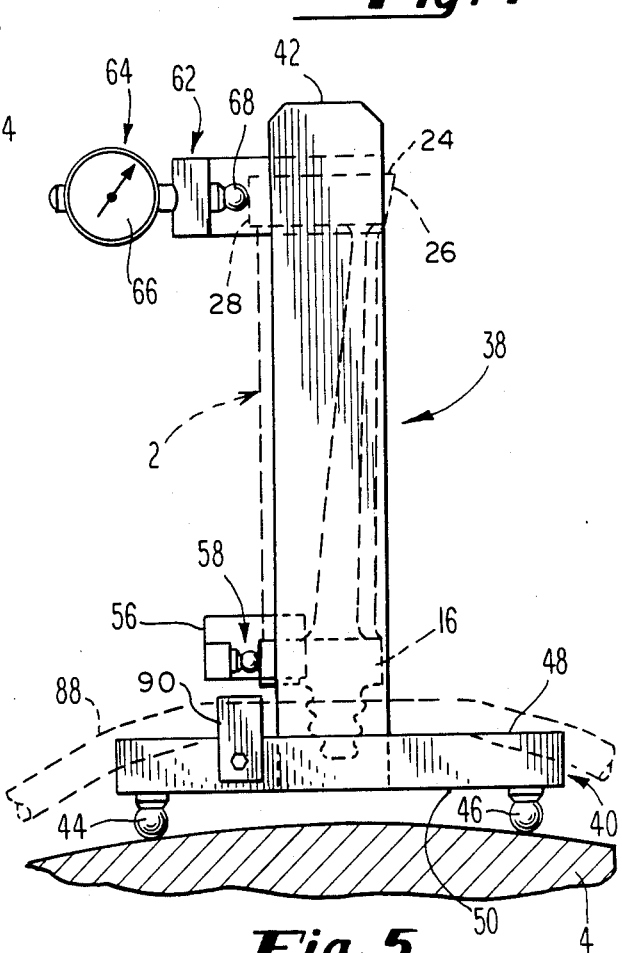
FIG. 5 is an axial view of a radial position gauge utilized in accordance with the present invention.

Referring generally now to FIGS. 5-8, a radial position gauge 38, as disclosed in U.S. patent application Ser. No. 913,881, filed Sept. 30, 1986, in the names of Marshall J. Rouse and Albert J. Partington, assigned to the assignee of the present invention and incorporated herein by reference, is illustrated. As shown in FIG. 5, a simplified view looking axially along the surface of the turbine rotor 4 shows a blade 2 in phantom lines with a left-hand form of the radial position gauge 38. The gauge 38 includes an elongated base member 40 and a standard 42 extending substantially perpendicular from the base member 40. First and second elevated contact points in the form of tooling balls 44 and 46 are attached in spaced apart relationship to a lower surface of the member 40. The tooling balls 44 and 46, well known in the machinist's art, provide contact points between the gauge 38 and the surface of the rotor 4 and support the member 40 adjacent to the rotor 4 in a plane substantially parallel to a tangent line to the rotor surface. The balls 44 and 46 may be attached to the member 40 in a manner well known in the art such as, for example, by being drilled and tapped and connected by screw-type studs. The standard 42 has one end fixedly attached to member 40 by bolts or welds (not shown). For simplicity of construction end use, both member 40 and standard 42 are preferably formed or machined as elongated bars having substantially parallel opposing surfaces 48, 50 and 52, 54, respectively.

Standard 42 supports an arm member 56 extending from a lower portion thereof and carrying a tooling ball 58. The arm member 56 is positioned such that the tooling ball 58 creates a third contact point for contacting a surface 60 of the blade platform portion 16 when the gauge 38 is in a measuring position. It should be noted at this juncture that platform 16 is a precision machined portion of the blade 2 and is carefully situated with respect to the root portion 6, surface 60 being machined parallel to the blade center line 32.

At a distal end of the standard 42 from member 40, there is located a second arm 62 which supports a measuring apparatus 64 including a dial indicator 66 and a reciprocating plunger 68. The arm 62 supports the apparatus 64 such that the plunger 68 is brought into contact with the trailing planar surface 28 of the shroud portion 24 of blade 2 when the gauge 38 is in its measuring position. The apparatus 64 is calibrated with respect to the third contact point so that any deviation of the alignment of blade 2 off a rotor radial line through the center of the blade root will result in a non-zero reading. Shroud portion 24, like surface 60, is a precision machined portion of the blade 2.

Figure 8:
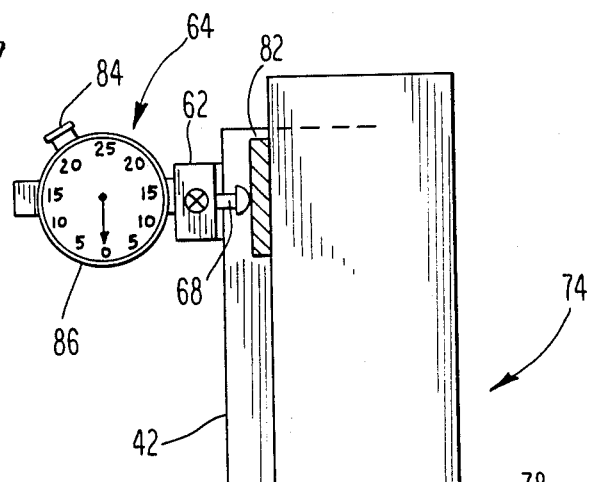
FIG. 8 is an elevational view illustrating one method of calibration of an illustrative form of the radial position gauge.
Figure 8:
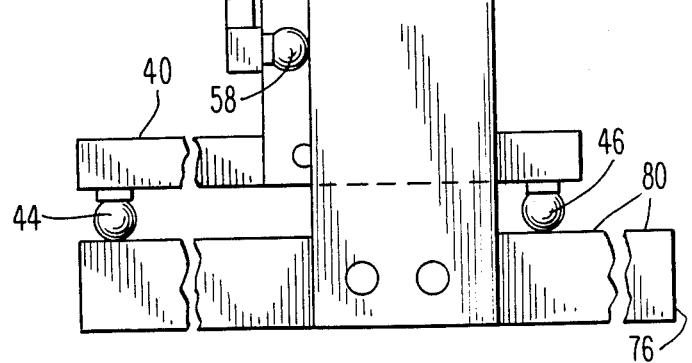

Turning briefly to FIG. 8, there is illustrated one method and apparatus for calibrating the gauge 38. A gauge calibration stand 74 comprising a base 76 and a perpendicular member 78 is used to establish zero calibration of the dial indicator 66. The base 76 has a precision machined flat top surface 80, member 78 being attached to base 76 to form a perpendicular reference. The gauge 38 is placed on surface 80 and positioned with tooling ball 58 in contact with member 78. Depending upon the particular design or configuration of the turbine blade 2 to be aligned, various thickness shims 82 are positioned between member 78 and plunger 68 of the measuring apparatus 64. With the gauge 38 in position against member 78, a bezel lock 84 is released to allow bezel 86 on the dial indicator 66 to be turned for setting a zero reading, lock 84 thereafter being tightened. This completes the calibration of gauge 38 and prepares it for use in determining alignment of blades 2 on the rotor 4.

Figure 6:
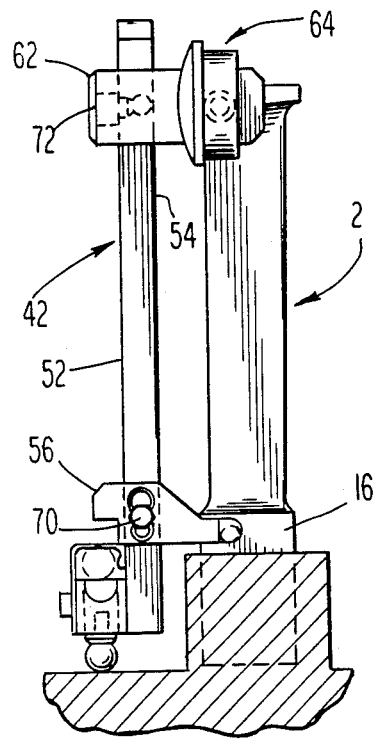
FIG. 6 is an tangential view of another form of the radial position gauge in operative position with a turbine blade.
Figure 7:
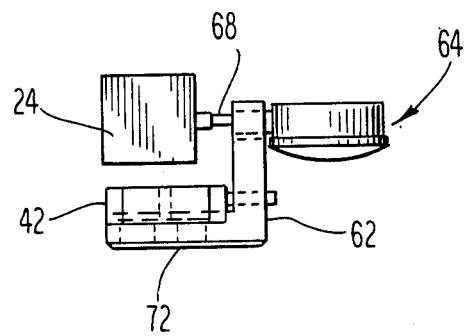
FIG. 7 is a radial view of the gauge shown in FIG. 6.

The method of determining blade alignment can be appreciated by reference to FIGS. 5-6. The gauge 38 is placed on the rotor 4 adjacent to one of the blades 2, with the tooling balls 44 and 46 resting on the surface of the rotor 4 assuring alignment of the gauge 38 with a rotor radius. As is well known, the surface of the rotor 4 includes a plurality of alternating lands and valleys (shown in FIG. 6) in the axial direction, the lands having the slots or grooves 8 formed therein for receiving the root portions 6 of the blades 2. The gauge 38 is positioned for use on the surface of the rotor 4 in a valley adjacent a blade 2 to be measured, and is moved circumferentially on the surface of the rotor 4 until the tooling ball 58 contacts the blade platform portion 16. In order to avoid having to hold the gauge 38 in place for checking alignment of each blade 2, an elastic cord 88, e.g., a bungy cord, is wrapped around the rotor 4 and over base member 40. For that purpose, there is provided a retaining member 90 attached to the base member 40 having a double-folded lip for engaging and slidably holding cord 88. With ball 58 in position against platform 16, any non-zero reading of the dial indicator 66 represents a deviation of the blade centerline 32 from a rotor radius line. The blade 2 may be replaced if the deviation exceeds allowable limits. Further details relating to the radial position gauge 38 may be found in the above referenced U.S. patent application Ser. No. 913,881, now U.S. Pat. No. 4,718,172.

Referring now to FIG. 9, the row assembly process according to the present invention will now be explained. In preparation for such process, the radial position gauge 38 is calibrated, and installed upon the rotor 4 by the elastic cord 88. An anchor blade 92, comprised generally of a standard blade 2 having a support plate 94 attached thereto (such as by welding) and a means for adjusting 96 the radial position of the blade 92 is inserted within a selected groove 8 (G2 as shown). The adjusting means 96 includes a threaded portion 98 attached to the support plate 94, an adjusting screw 100 threadedly coupled within the threaded portion 98, and a swivel foot portion 102 attached to the adjusting screw 100 at its end.

In a rotor 4 having N number of grooves 8 (G1-GN as shown in FIG. 9), the row assembly process according to the present invention is started by inserting the anchor blade 92 within groove G2 and shimmed medium tight to provide a preload on the adjusting screw 100. The anchor blade 92, as installed, is held in place from rocking primarily by the adjusting means 96, not the shims or root-groove fit. An anchor blade deflection monitor 104, such as a bar 106 inserted within a notch 108 formed in the support plate 94, is rigidly coupled to the support plate 94 such as by clamping means (not shown). Thereafter, a monitor blade 110 is inserted within the next vacant groove in a clockwise direction (G6 as shown in FIG. 8) in order to provide a measurable gap 112 between the bar 106 and the monitor blade 110. The monitor blade 110 is shimmed tightly within its groove by shim 116.

After the anchor blade 92, with its deflection monitor 104, and the monitor blade 110 are installed, the remaining blades, starting with a closing blade 114, are installed from the inlet side of the rotor 4 at a 10 o'clock or 2 o'clock position thereof. With the anchor blade 92, the anchor blade deflection monitor 104 and the closing blade 114 in place, the blades 2 are installed in descending numerical order in a counterclockwise fashion around the rotor. That is, the first blade 2 to be installed after installation of the closing blade 114 is the blade which is installed within the groove 8 shown in FIG. 9 as GN, followed by GN-1, GN-2, ... 9,8, and 7, where N is the highest numbered blade in the row equal to the number of blades per row.

A flat shim 116, having a thickness which will allow the shroud portion 24 of the installed blade to fall against the shroud portion 24 of an adjacent blade 2, may be inserted under the root portion 6 within the groove 8. The shims 116 should be installed within the grooves 8 so that they do not interfere with the radial gauge 38, and shim clearance should be less than 0.003 inches. A blade locking device is conventionally installed in order to lock the blade 2 in place. At least one tapered wedge 118 is then inserted under the concave side of the platform portion 16 to provide a tight metal-to-metal contact between adjacent shroud portions 24. The radial position of the installed blade 2 is then measured in accordance with the above referenced U.S. patent application Ser. No. 913,881, and recorded. Ten blades 2 on both sides the closing blade 114 are leaned towards the closing blade 114. That is, blades 2 in grooves number GN to GN-9 are leaned towards the closing blade 114, while blades 2 in grooves number G11 to G2 are leaned towards the closing blade 114. The blades 2 installed within grooves number GN-10 to G12 preferably have no lean at all.

Periodically, the gap 112 between the another deflection monitor 104 and the monitor blade 110 is measured, recorded, and adjusted until deflection changes are negligible. The anchor blade deflection monitor 104 may suitably be removed after the blade 2 in groove number G10 is installed. Blade assembly is continued in a descending sequence of blade numbers until the blade 2 in groove number G7 has been assembled.

At the start of the row closing process, the anchor blade deflection monitor 104 has been removed, but the anchor blade 92 is still in place, with bldaes 2 in grooves number G1, GN, GN-1, ... G-9,8, and G7 having been installed. All blades 2 have a locking device, such as a pin as disclosed in the above referenced U.S. Pat. No. 4,533,298 and 4,602,412, installed with the exception of the closing blade 114 in groove number G1. The closing blade 114 is locked by any convenient means, one means being shown in copending U.S. patent application Ser. No. 844,496, filed Mar. 26, 1986 now U.S. Pat. No. 4,676,723 of William E. Kiger and Jurek Ferleger, assigned to the assignee of the present invention, and incorporated herein by reference. Furthermore, all blades 2 will have one or more tapered wedges 118 on the concave side of the blade 2 between the underside of the blade platform 16 and the top of the steeple, tending to push each of the shroud portions 24 towards the shroud portion 24 of the anchor blade 92.

Referring again to FIG. 9, the radial positions of blades 2 installed within grooves number GN and G7 must be verified and recorded before starting the closing process. The gap between the shroud portion 24 of the blades 2 installed within grooves number G7 and G1 is thereafter measured with any suitable means. Starting with the blade 2 installed within groove number GN/2 (i.e., that groove 8 having the number equal to half of the total number of grooves in a row), and working towards the anchor blade 92, each of the tapered wedges 118 are moved one at a time from the concave to the convex side of the platform portion 16 so that in both halves of the row the blades 2 are being forced towards the blade 2 in groove number GN/2 and away from the closing blade 114. This relieves the force on the anchor blade 92 and holds the shroud portions 24 tight together so that the anchor blade 92 can be removed. After the tapered wedges 118 have been reversed on half of the row from the blade 2 within groove number GN/2 to the blade 2 within groove number GN, as well as on the blade 2 within groove number G1. The anchor blade 92 is then removed.

Any change in the radial position of the blades 2 contained within grooves number GN and G7, as a result of reversing the tapered wedges 118 on half of the row and removing the anchor blade 92, is determined. Next, the blades 2 necessary for installation within grooves number G6,G5,G4 and G3 are installed as described herein above.

A closing blade interference will cause the blades 2 on the both sides thereof to move away from the closing blade 114. It can be assumed that the blades 2 in grooves number GN to GN-9 will change the radial position values by I/2 in the positive direction, where I is the interference, and the blades 2 in grooves number G2 to G11 will change their values by I/2 in the negative direction. Thereafter, the maximum interference I that will not cause any of the ten blades on either side of the closing blade 114 to be out of an allowable radial position is determined. The blade 2 contained within groove number G1 is then removed in order that the blade 2 for groove number G2 may be temporarily installed. However, before installation of the blade 2 within groove number G2, a total shroud length to be removed from the blades 2 for installation within grooves number G1 and G2 must be determined. That is; by measuring the shroud length of the closing blade 114, and the opening for the closing blade 114, the total shroud length to be removed from the blades 2 for installation within grooves number G1 and G2 is equal to the closing blade shroud length minus the opening for the closing blade and the maximum interference. The shroud length to be removed from the blade 2 for installation within groove number G2 should be substantially equal to half of the total shroud length to be removed. Thereafter, the blade 2 installation within the groove number G2 is sized and installed within the groove number G2. The opening for the closing blade is then remeasured, and appropriate amount of shroud length removed therefrom, the remaining gap between the blade 2 installed within groove number G2 and GN spread by means such as a bolt spreader (not shown), and the modified closing blade 114 installed therein. After the closing blade 114 is locked in place, all of the tapered wedges 118 must be removed. The outer peripheral surface of the shroud portions 16 of the circular array of blades 2 may be suitably machined thereafter to form a cylindrical surface which cooperates with a labyrinth seal to form a rotating seal.

The complete assembly process described herein above includes preparation, starting the row assembly, typical blade assembly, closing the row, and locking the closing blade. Further details may be found in Process Specification (Fed.Code 8857) No. 80308 LV (revision 1), entitled "Assembly of Integral Shroud Blades", of Westinghouse Electric Corporation. Ideally, after all blades are assembled, all blade radial lines coincide with the groove center lines, with the shroud mating surfaces in complete contact and in tangential compression. Thus, the blade root is allowed to seat in an acceptable position during turbine operation while minimizing blade motion during rotor turning gear operation. Obviously many modifications and variations of the present invention are possible in light of the above teaching. It is therefore to be understood that within the scope of the appended claims the invention may be practiced otherwise than as specifically described.

I claim as my invention:

1. In a steam turbine having a rotor with a plurality of grooves formed therein, the grooves extending longitudinally with respect to the rotor and spaced equidistantly radially thereabout, an improved method of forming a circular array of blades on the rotor wherein each of the blades includes a root portion adaption to fit within a respective one of the grooves, a blade portion extending radially outward from the root portion separated therefrom by a platform portion, and a shroud portion formed integrally with the blade portion at its radial outer end, said improved method comprising the steps of:
   (a) forming a plurality of the blades;
   (b) anchoring one of the blades inserted within a selected one of the grooves;
   (c) monitoring any subsequent deflection of said anchored blade to determine its movement from a predetermined radial position;
   (d) inserting a second one of the blades within a groove adjacent to said selected groove;
   (e) inserting another one of the blades within a next adjacent groove;
   (f) locking said other one of the blades within its respective groove;
   (g) prestressing said other one of the blades at its shroud portion in a direction towards said anchored blade;
   (h) positioning said other one of the blades radially with respect to its groove;
   (i) repeating steps (e), (f), (g) and (h) subsequentially for each of a predetermined number of the remaining blades;
   (j) relieving the force exerted upon said anchored blade by said prestressing steps;
   (k) removing said anchored blade;
   (l) installing the remaining blades in respective grooves vacated by step (k) by repeating steps (e),(f),(g) and (h) therefor;
   (m) removing said second one of the blades;
   (n) determining the size of the gap between the shroud portions of the blades installed on either side of the groove vacated by step (m);
   (o) modifying the shroud portion of said second one of the blades to provide an interference fit within said gap;
   (p) installing said modified blade within the groove vacated by step (m); and
   (q) locking said modified blade installed within its groove.

2. The method according to claim 1, wherein step (b) comprises:
   rigidly attaching a plate portion to the blade perpendicular to its respective blade portion;
   providing a means of adjusting the radial position of the blade within said selected groove; and
   adjusting the blade to a predetermined radial position.

3. The method according to claim 2, further comprising the step of forming a notch within said plate portion.

4. The method according to claim 3, wherein said monitoring step comprises:
   inserting a bar within said notch, said bar extending therefrom in a direction perpendicular to the blade portion.
   clamping said bar inserted within said notch;
   inserting a monitor blade in the next vacant groove proximate to the distal end of said bar;
   shimming said monitor blade tightly within its respective groove; and
   measuring the distance between the distal end of said bar and the shroud portion of said monitor blade.

5. The method according to claim 2, wherein said providing step comprises;
   forming a threaded portion;
   attaching said threaded portion to said plate portion;
   forming an adjusting screw having threads adapted to be coupled to said threaded portion;

threadedly coupling said adjusting screw within said jam nut;

forming a foot portion adapted to swivel about the end of said threadedly coupled adjusting screw; and attaching said foot portion to said adjusting screw at its end.

6. The method according to claim 1, wherein step (g) comprises:

providing a pair of tapered wedges; and inserting at least one of said pair of tapered wedges between the rotor at its inlet side and the platform portion of the blade on a selected side thereof such that said wedged blade at its shroud portion abuts the shroud portion of the next adjacent blade.

7. The method according to claim 6, further comprising the step of inserting one of said pair of tapered wedges between the rotor at its outlet side and the platform portion of the blade on said selected side.

8. The method according to claim 7, wherein said relieving step comprises:

(a) selecting one of the prestressed blades;

(b) removing the tapered wedges inserted beneath the platform portion of said selected blade;

(c) replacing the removed wedges beneath the platform portion on the side of the blade portion opposite said selected side;

(d) removing the tapered wedges inserted beneath the platform portion of the next adjacent blade closer to said anchored blade; and (e) repeating steps (c) and (d) for each of the blades between said selected blade and said anchored blade.

9. The method according to claim 1, wherein said positioning step comprises:

providing an elongated base member having substantially parallel upper and lower surfaces;

forming first and second elevated contact points in a spaced apart relationship on said lower surface of said base member, said contact points being adapted to support said base member adjacent the rotor in a plane substantially parallel to a line tangent to the rotor surface;

proving a standard having one end fixedly connected to said base member, said standard extending radially outward with respect to the rotor;

forming a third contact point extending from said standard and positioned for contacting the platform portion of a blade when in a measuring position;

providing a dial indicator having a reciprocating plunger connected thereto, wherein the extension of said plunger with respect to said dial indicator provides a reading on said dial indicator representative thereof;

attaching said dial indicator to said standard such that said plunger contacts the shroud portion of a blade when in said measuring position;

calibrating said dial indicator such that a deviation of radial alignment of the blade with respect to a rotor radial line through the center of its root portion is provided by said indicator;

measuring said deviation; and adjusting the measured blade until said deviation is substantially equal to a predetermined value.

10. A method of installing turbine blades in rows upon a rotor having an inlet side, an outlet side, and a plurality of N grooves formed therein, the grooves extending longitudinally with respect to the rotor and spaced equidistantly radially thereabout, wherein each of the turbine blades includes a root portion adapted to fit within a respective one of the grooves, a blade portion extending radially outward from the root portion separated therefrom by a platform portion having a concave side and a convex side, with a means for locking the blade to the rotor included on the concave side thereof, and a shroud portion formed integrally with the blade portion at its radial outer end, said method comprising the steps of:

(a) determining a sequence of rows to be installed upon the rotor;

(b) forming a plurality of the blades;

(c) rigidly attaching a plate portion to one of the blades perpendicular to its respective blade portion, said plate portion spanning a distance substantially corresponding to the distance separating two of the grooves;

(d) inserting, from the inlet side of the rotor at a selected row thereof, the blade having said attached plate portion within a selected one of the grooves, said selected groove comprising groove number two;

(e) providing a means of adjusting the radial position of the blade within said selected groove;

(f) inserting a shim beneath the root portion of the blade inserted within said selected groove said shim preloading said adjusting means;

(g) inserting, from the inlet side of the rotor, a monitor blade in the next vacant groove clockwise from said groove number two;

(h) shimming said monitor blade tightly within its respective groove;

(l) monitoring the distance between said attached plate portion and said monitor blade;

(j) inserting, from the inlet side of the rotor, another one of the blades within a next adjacent groove counterclockwise from said groove number two;

(k) inserting at least one tapered wedge beneath the platform portion, on its concave side, of the blade inserted by step (j), said at least one tapered wedge being inserted to provide a predetermined contact between the shroud portion of the blade inserted by step (k) and the shroud portion of its next adjacent clockwise blade;

(l) positioning said other one of the blades in a predetermined direction radially with respect to its groove;

(m) repeating steps (j), (k), and (l) sequentially for each of said grooves number N through seven;

(n) recording the radial positions of the blades inserted within said grooves number N and seven;

(o) measuring the gap between the blades inserted with said grooves number one and seven;

(p) removing the tapered wedge inserted beneath the concave side of the platform portion of a selected blade;

(q) replacing said removed tapered wedge beneath the convex side of the platform portion of said selected blade;

(r) repeating steps (p) and (q) sequentially for each of the blades in a clockwise direction between said selected blade and the blade inserted within said groove number one;

(s) removing the blade having said attached plate portion from within said groove number two;

(t) determining any change of radial position of the blades inserted within said groove numbers N and seven;
(u) repeating steps (j), (k) and (l) sequentially for each of said grooves number six, five, four and three;
(v) removing the blade installed within said groove number one;
(w) determining a total shroud length which must be removed from blades installed within said groves number one and two to provide an interference fit;
(x) modifying the shroud portions of each of the blades to be installed within said grooves number one and two such that their lengths when combined substantially equals said total shroud length;
(y) inserting said modified blades respectively within said grooves number two and one;
(z) locking the blade inserted within said groove number one;
(aa) removing each of said tapered wedges; and
(bb) machining the shroud portions of each of the blades of said selected row to provide a uniformly shaped shroud assembly.

11. The method according to claim 10, wherein step (e) comprises the steps of:
forming a threaded portion;
attaching said threaded portion to said plate portion;
forming an adjusting screw having threads adapted to be coupled to said threaded portion;
threadedly coupling said adjusting screw within said threaded portion;
forming a foot portion adapted to swivel about the end of said threadedly coupled adjusting screw; and
attaching said foot portion to said adjusting screw at its end.

12. The method according to claim 10, further comprising the step of locking each of the blades inserted in said grooves N through 2 sequentially between their respective steps (j) and (k).

13. The method according to claim 10, wherein said next adjacent groove counterclockwise from said groove number two comprises groove number one.

14. The method according to claim 13, wherein said predetermined direction comprises a direction towards said groove number one.

15. The method according to claim 13, wherein step (l) comprises the steps of;
leaning each of the blades inserted within said grooves number N to and through N-9 an amount corresponding to a first predetermined range of distances from a radial line of the rotor through the center of the respective groove to a centerline of the blade;
leaning each of the blades inserted within said grooves number N-10 to and through twelve an amount corresponding to a second predetermined range of distance from its respective radial line to the centerline of the blade; and
leaning each of the blades inserted within said grooves number eleven to and through two an amount corresponding to a third predetermined range of distances from its respective radial line to the centerline of the blade.

16. The method according to claim 15, wherein said amount of lean for each of the blades inserted with said grooves number N-10 to and through twelve is subtantially equal to zero.

17. The method according to claim 10, wherein step (k) comprises the steps of:
inserting, from the inlet side of the rotor, one tapered wedge beneath the platform portion, on its concave side, of the blade inserted by step (j); and
inserting, from the outlet side of the rotor, another tapered wedge beneath the platform portion, on its concave side, of the blade inserted by step (j).

* * * * *